(12) United States Patent
Kaganovich et al.

(10) Patent No.: US 9,246,295 B2
(45) Date of Patent: Jan. 26, 2016

(54) PULSE-SHAPING INTERFEROMETER FOR CHIRPED-PULSED AMPLIFICATION LASER

(71) Applicants: Dmitri Kaganovich, Potomac, MD (US); Joseph R. Penano, Fairfax Station, VA (US); Michael H. Helle, Arlington, VA (US); Antonio C. Ting, Silver Spring, MD (US); Daniel F. Gordon, Alexandria, VA (US); Bahman Hafizi, Bethesda, MD (US)

(72) Inventors: Dmitri Kaganovich, Potomac, MD (US); Joseph R. Penano, Fairfax Station, VA (US); Michael H. Helle, Arlington, VA (US); Antonio C. Ting, Silver Spring, MD (US); Daniel F. Gordon, Alexandria, VA (US); Bahman Hafizi, Bethesda, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/551,329

(22) Filed: Nov. 24, 2014

(65) Prior Publication Data
US 2015/0146748 A1    May 28, 2015

Related U.S. Application Data

(60) Provisional application No. 61/908,427, filed on Nov. 25, 2013.

(51) Int. Cl.
*H01S 3/10* (2006.01)
*H01S 3/00* (2006.01)
*H01S 3/13* (2006.01)
*H01S 3/11* (2006.01)
*G02B 26/00* (2006.01)

(52) U.S. Cl.
CPC ............ *H01S 3/0057* (2013.01); *G02B 26/001* (2013.01); *H01S 3/1003* (2013.01); *H01S 3/10023* (2013.01); *H01S 3/11* (2013.01); *H01S 3/1305* (2013.01)

(58) Field of Classification Search
CPC .............. H01S 3/0092; H01S 3/06754; H01S 3/094069; H01S 3/10053; H01S 3/1083
USPC ........................................................... 372/25
See application file for complete search history.

(56) References Cited

U.S. PATENT DOCUMENTS 5,754,292 A * 5/1998 Kane et al. ..................... 356/450
6,577,428 B2 * 6/2003 Stappaerts ........... G02B 6/0841
                                              359/237

(Continued)

OTHER PUBLICATIONS

Kiriyama, H., et al., "High-contrast 2.0 Petawatt Ti:sapphire laser system", Opt. Express., vol. 21, No. 24, pp. 29231-29249, Nov. 18, 2013.

(Continued)

*Primary Examiner* — Tod T Van Roy
*Assistant Examiner* — Vu A Vu
(74) *Attorney, Agent, or Firm* — US Naval Research Laboratory; Sally A. Ferrett

(57) ABSTRACT

A high power ultrashort chirped pulse amplifier laser system, with a chirped pulse amplifier laser module including an optical pulse stretcher, at least one optical power amplifier, and an optical pulse compressor, and a beam interferometer module in the optical path. The beam interferometer receives splits the pulse into at least two pulses, adds a time delay to at least one of the pulses and recombines the pulses to produce a temporally modulated pulse. The resulting modulated output pulse from the CPA laser module can have enhanced laser contrast due to greatly reduced subpicosecond pedestal in the immediate region of the peak pulse, or can have other desirable characteristics.

30 Claims, 8 Drawing Sheets

(56) References Cited

U.S. PATENT DOCUMENTS

| | | | |
|---|---|---|---|
| 6,804,287 B2 * | 10/2004 | Backus et al. | 372/70 |
| 7,365,858 B2 * | 4/2008 | Fang-Yen et al. | 356/489 |
| 7,433,043 B2 * | 10/2008 | Birge et al. | 356/450 |
| 7,782,914 B2 * | 8/2010 | Faure et al. | 372/25 |
| 2009/0281530 A1 * | 11/2009 | Korn | A61F 9/008 606/5 |
| 2011/0274127 A1 * | 11/2011 | Masuda et al. | 372/25 |

OTHER PUBLICATIONS

Kiriyama, H.; Shimomura, T.; Sasao, H.; Nakai, Y.; Tanoue, M.; Kondo, S.; Kanazawa, S.; Pirozhkov, A.S.; Mori, M.; Fukuda, Y.; Nishiuchi, M.; Kando, M.; Bulanov, S.V.; Nagashima, K.; Yamagiwa, M.; Kondo, K.; Sugiyama, A.; Bolton, P. R.; Tajima, T.; and Miyanaga, N.; "Temporal contrast enhancement of petawatt-class laser pulses", Opt. Lett., vol. 37, No. 16, pp. 3363-3365, posted Jun. 22, 2012, published Aug. 6, 2012.

Wharton, K. B.; Boley, C.D.; Komashko, A.M.; Rubenchik, A. M.; Zweiback, J.; Crane, J.; Hays, G.; Cowan, T.E.; and Ditmire, T.; "Effects of nonionizing prepulses in high-intensity laser-solid interactions", Phys. Rev. E, vol. 64, pp. 025401-1-025401-5, Jul. 2001.

Leemans, W.P.; Catravas, P.; Esarey, E.; Geddes, C.G.R.; Toth, C.; Trines, R.; Schroeder, C.B.; Shadwick, B.A.; van Tilborg, J.; and Faure, J.; "Electron-Yield Enhancement in a Laser-Wakefield Accelerator Driven by Asymmetric Laser Pulses", Phys. Rev. Lett, vol. 89, No. 17, pp. 174802-1-174802-4, Oct. 2002.

Mangles, S.P.D.; Thomas, A.G.R.; Kaluza, M.C.; Lundh, O.; Lindau, F.; Persson, A.; Najmudin, Z.; Wahlström, C.-G., Murphy, C.D.; Kamperidis, C.; Lancaster, K.L.; Divall, E.; and Krushelnick, K.; "Effect of laser contrast ratio on electron beam stability in laser wakefield acceleration experiments", Plasma Phys. Cont. Fusion, vol. 48, pp. B83-B90, Nov. 2006.

Kalashnikov, M.P.; Risse, E.; Schnnagel, H.; and Sandner, W.; "Double chirped-pulse-amplification laser: a way to clean pulses temporally", Opt. Lett., vol. 30, pp. 923-925, Apr. 2005.

Jullien, A.; Albert, O.; Burgy, F.; Hamoniaux, G.; Rousseau, J.-P.; Chambaret, J.-P.; Aug-Rochereau, F.; Chriaux, G.; and Etchepare, J.; "10-10 temporal contrast for femtosecond ultraintense lasers by cross-polarizedwave generation", Opt. Lett, vol. 30, pp. 920-922, Apr. 2005.

Hong, K.-H.; Hou, B.; Nees, J.; Power, E.; and Mourou, G.; "Generation and measurement of >108 intensity contrast ratio in a relativistic kHz chirped-pulse amplified laser", Appl.Phys. B, vol. 81, pp. 447-457, Jul. 2005.

Verhoef, A.; Seres, J.; Schmid, K.; Nomura, Y.; Tempea, G.; Veisz, L.; and Krausz, F.; "Compression of the pulses of a Ti:sapphire laser system to 5 femtoseconds at 0.2 terawatt level", Appl. Phys. B, vol. 82, pp. 513-517, Jan. 2006.

Kalashnikov, M.P.; and Osvay, K.; "High peak power Ti:sapphire lasers: temporal contrast and spectral narrowing issues", Proc. SPIE, vol. 5975, 59750E-1-5970E-12, Feb. 2006.

Hooker, C.; Tang, Y.; Chekhlov, O.; Collier, J.; Divall, E.; Ertel, K.; Hawkes, S.; Parry, B.; and Rajeev, P.P.; "Improving coherent contrast of petawatt laser pulses", Opt. Express, vol. 19, pp. 2193-2203, Jan. 2011.

Helle, M.H.; Gordon, D.F.; Kaganovich, D.; and Ting, A., "Extending electro-optic detection to ultrashort electron beams", Phys. Rev. ST Accel. Beams, vol. 15, pp. 052801-1-052801-11, May 3, 2012.

Overfelt, P.L.; and Kenney, C.S.; "Comparision of the propagation characteristics of Bessel, Bessel-Gauss, and Gaussian beams diffracted by a circular aperture", J. Opt. Soc. Am. A, vol. 8, pp. 732-745, May 1991.

Zhou, J.; Taft, G.; Huang, C.-P.; Murnane, M.M.; Kapteyn, H.C.; and Christov, I.P.; "Pulse evolution in a broad-bandwidth Ti:sapphire laser", Opt. Lett., vol. 19, pp. 1149-1151, Aug. 1994.

Moulton, P.F.; "Spectroscopic and laser characteristics of Ti:Al2O3", J. Opt. Soc. Am. B, vol. 3, pp. 125-133, Jan. 1986.

Tournois, P.; "Acousto-optic programmable dispersive filter for adaptive compensation of group delay time dispersion in laser systems", Opt. Commun., vol. 140, pp. 245-249, Aug. 1997.

Gonsalves, A.J.; Nakamura, K.; Lin, C.; Panasenko, D.; Shiraishi, S.; Sokollik, T.; Benedetti, C.; Schroeder, C.B.;. Geddes, C.G.R.; van Tilborg, J.; Osterhoff, J.; Esarey, E.; Toth, C.; and Leemans, W.P.; "Tunable laser plasma accelerator based on longitudinal density tailoring", Nature Physics Letters, pp. 862-866, Aug. 21, 2011.

Ting, A.; Kaganovich, D.; Gordon, D.; Zigler, A.; Jones, T.; Briscoe, E.; Hubbard, R.; and Sprangle, P.; "Laser Wakefield Acceleration with Optically Injected Electrons at the Naval Research Laboratory", The 11th Advanced Accelerator Concepts Workshop 2004, Stony Brook, NY, Jun. 21-26, 2004, 16 pages, Jun. 2004.

Kaganovich, D.; Peñano, J. R.; Helle, M.H.; Gordon, D.F., Hafizi, B.; and Ting, A.; "Origin and control of the subpicosecond pedestal in femtosecond laser systems", Opt. Lett., vol. 38, No. 18, pp. 3635-3638.

Sprangle, P.; and Hafizi, B.; "High-power, high-intensity laser propagation and interactions", AIP Physics of Plasmas, vol. 21, pp. 055402-1-055402-12, May 27, 2014.

Wang, Y.; Ma, J.; Wang, J.; Yuan, P.; Xie, G.; Ge, X.; Liu, F.; Yuan, X.; Zhu, H. & Qian, L. "Single-shot measurement of >1010 pulse contrast for ultra-high peak-power lasers", Sci. Rep., vol. 4, pp. 3818 (5 pages), Jan. 22, 2014.

\* cited by examiner

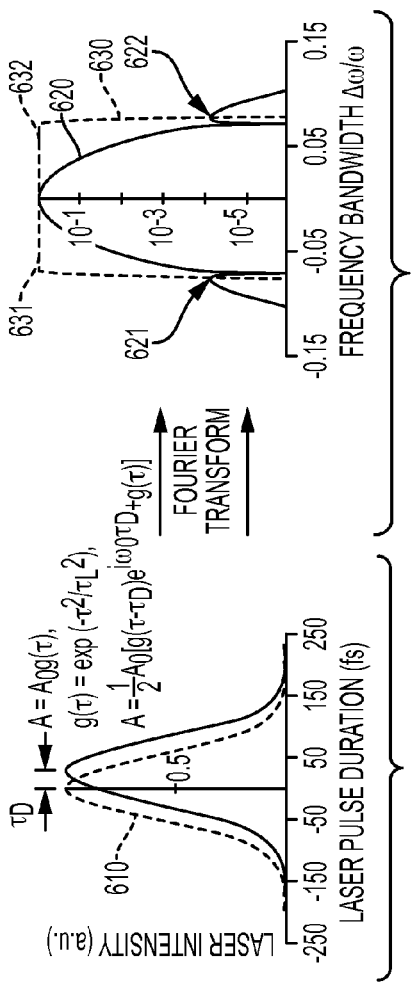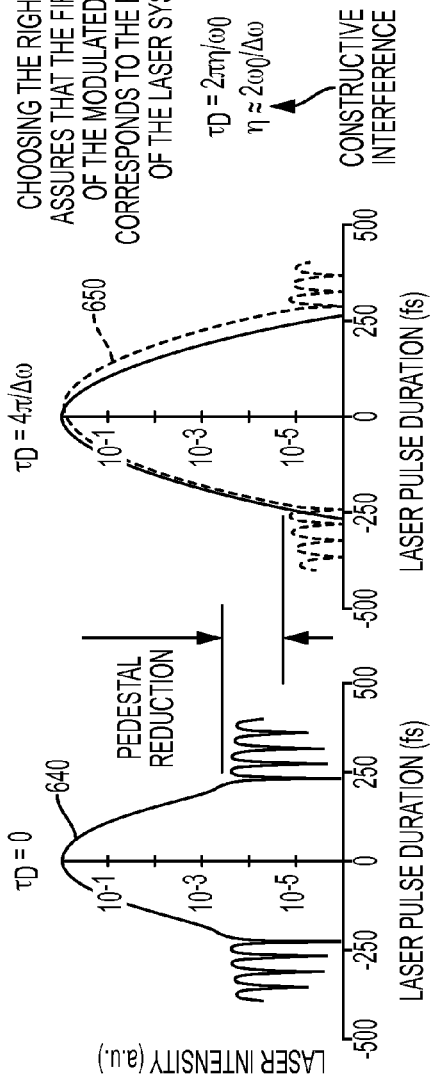
FIG. 6A
FIG. 6B
FIG. 6C

PULSE-SHAPING INTERFEROMETER FOR CHIRPED-PULSED AMPLIFICATION LASER

BACKGROUND

1. Technical Field

This application is related to the field of chirped-pulse amplifier systems.

2. Related Technology

Chirped-pulse amplification (CPA) laser systems were initially developed in the 1980s. Before CPA systems were developed, laser amplifiers generating ultrashort pulses were limited in optical intensity by a tendency of high optical power pulses to cause nonlinear pulse distortion or to damage the amplifier gain medium or the optical elements. In CPA laser systems, the pulses are chirped and temporally stretched to a much longer duration before passing through the gain medium, so the peak power is kept at a lower level during amplification. A dispersive compressor then removes the chirp and temporally compresses the pulses to a duration similar to the input pulse duration. CPA laser technology has been widely adopted for high power lasers, compact high power lasers (e.g., table top terawatt (T3) lasers) and in applications such as laser wakefield accelerated electron beam systems.

H. Kiriyama et al., Opt. Lett. 37, 3363, (2012) and K. B. Wharton et al., Phys. Rev. E 64, 025401, (2001) discuss laser pulse contrast and shape for subpicosecond, multiterawatt chirped-pulse amplification (CPA) laser systems.

K. B. Wharton et al., Phys. Rev. E, Vol. 64, pp. 025401-1-025401-4 (R), July 2001, discusses the effects of non-ionizing prepulses in high-intensity laser-solid interactions. Both W. P. Leemans et al., Phys. Rev. Lett. 89, 174802, (2002) and S. P. D. Mangles et al., Plasma Phys. Cont. Fusion 48, B83, (2006) discuss pulse shape and pre-pulse contrast in terms of the usability of laser wakefield accelerated electron beams.

H. Kiriyama et al., Opt. Lett. 37, 3363, (2012), M. P. Kalashnikov et al., Opt. Lett. 30, 923 (2005), A. Jullien et al., Opt. Lett. 30, 920 (2005), and K.-H. Hong et al., Appl. Phys. B 81, 447 (2005) disclose techniques for reducing amplified spontaneous emission (ASE) that can manifest as nanosecond-scale pedestal superimposed on the main pulse.

A. Verhoef, J. Seres, K. Schmid, Y. Nomura, G. Tempea, L. Veisz, and F. Krausz, Appl. Phys. B, Vol. 82, 513, (2006) discusses compression techniques for a 5 femtoseconds 0.2 terawatt Ti:sapphire CPA laser system.

M. P. Kalashnikov and K. Osvay, Proc. SPIE 5975, 59750E (2006) and C. Hooker et al., Opt. Express 19, 2193 (2011) discuss recent efforts in contrast enhancement related to prepulses and pedestals in the several picosecond to a few nanosecond range.

A. Jullien et al., Opt. Lett. 30, 920 (2005) and C. Hooker et al., Opt. Express 19, 2193 (2011) describes picosecond scale pedestals of $10^{-5}$-$10^{-4}$ for CPA laser systems. C. Hooker et al., Opt. Express 19, 2193 (2011) demonstrated that scatter from the diffraction gratings in the pulse stretcher contribute to a short time scale (20 ps) pedestal around the main pulse.

BRIEF SUMMARY

A high power chirped pulse amplifier system includes a chirped pulse amplifier laser module having an optical pulse stretcher that receives an optical pulse and temporally stretches duration of the pulse, at least one optical power amplifier that amplifies power of the temporally stretched pulse, and an optical pulse compressor that temporally compresses the amplified temporally stretched optical pulse; and at least one beam interferometer positioned in the optical path of the chirped pulse stretcher before the compressor, the amplifier or the stretcher, operable to receive an optical pulse, split the input pulse into at least two pulses, to direct the split pulses along an optical path such that at least one of the split pulses is time delayed with respect to another of the split pulses, and to recombine the split pulses after the time delay.

The high power chirped pulse amplifier system can generate a short pulse with enhanced laser contrast by constructive interference of the split pulses, with a time delay $\tau_D$ equal to about $2'\pi n/\omega_0$, where n is an integer approximately equal to $2\omega_0/\Delta\omega$, where $\Delta\omega$ is the characteristic full bandwidth of the system and $\omega_0$ is the optical frequency of an input optical pulse.

The high power chirped pulse amplifier system can generate a short pulse with enhanced laser contrast by constructive interference of the split pulses, wherein the time delay $\tau_D$ is such that a zero of a spectrum of the pulses from the beam interferometer corresponds with a low-pass limit of the system.

The beam interferometer can include at least one Michelson interferometer having a beamsplitter, a first arm, and a second arm with a different optical path length than the first arm to delay the pulse in the second arm with respect to the pulse in the first arm. The Michelson interferometer can have at least two retroreflectors, and a piezoelectric actuator configured to adjust the position of at least one of the retroreflectors to change the time delay of one of the optical pulses. Alternatively, the beam interferometer can include at least one optical etalon.

In the high power chirped pulse amplifier system, the at least one optical power amplifier can include a regenerative pre-amplifier and a main amplifier, and the chirped pulse amplifier module can also include a pulse slicer in an optical path between the regenerative amplifier and the main amplifier.

The high power chirped pulse amplifier system can also include a high dynamics range third-order polarization frequency-resolved optical gating and processor configured to receive the frequency-resolved optical gating and to extract the pulse profile with a phase retrieval algorithm.

The high power chirped pulse amplifier system can also include a controller and a feedback system for adjusting the time delay added to the at least one of the split pulses.

The high power chirped pulse amplifier system can also include a piezoelectric actuator configured to adjust the position of at least one of the reflectors to adjust a time delay.

A chirped pulse amplifier system includes a chirped pulse amplifier module having a stretcher, at least one amplifier, and a compressor, and an optical pulse generator operable to produce an optical pulse and transmit the optical pulse to the chirped pulse amplifier module, the optical pulse having a Fourier spectrum with a first zero corresponding to a zero low-pass limit of the chirped pulse amplifier module.

A method for generating high power ultrashort optical pulses includes receiving a short optical pulse; stretching a pulse duration of the pulse; amplifying the intensity of the stretched optical pulse; compressing the amplified stretched optical pulse to a pulse duration approximately equal to the duration of the optical pulse before stretching; and temporally modulating the optical pulse by splitting the pulse into at least two optical pulses, applying a non-zero time delay to at least one of the at least two optical pulses, and recombining the split pulses, before said compressing, said amplifying, or said stretching.

The step of temporally modulating the optical pulse can be done before stretching the short optical pulse.

A method for generating high power ultrashort optical pulses can generate pulses with enhanced laser contrast and reduced subpicosecond pedestal constructively interferes the split pulses, with the time delay $\tau_D$ being equal to about $2\pi n/\omega_0$, where n is an integer approximately equal to $2\omega_0/\Delta\omega$, where $\Delta\omega$ is the characteristic full bandwidth of the system and $\omega_0$ is the optical frequency of the input optical pulse. The The method for generating high power ultrashort optical pulses can generate pulses with enhanced laser contrast and reduced subpicosecond pedestal constructively interferes the split pulses with the time delay $\tau_D$ set to cause a zero of a spectrum of the temporally modulated pulse to correspond with a low-pass limit of the system.

The method for generating high power ultrashort optical pulses includes temporally modulating the optical pulse by passing the input optical beam through at least one Michelson interferometer having a beamsplitter, a first arm, and a second arm with a different optical path length than the first arm to delay the pulse in the second arm with respect to the pulse in the first arm. In some examples, the Michelson interferometer has at least two retroreflectors, and a piezoelectric actuator configured to adjust the position of at least one of the retroreflectors to change the time delay of one of the optical pulses.

In some examples, the step of temporally modulating the optical pulse is accomplished by passing the input optical beam through at least one optical etalon.

The step of amplifying the modulated optical pulse can include passing the modulated optical pulse through a regenerative pre-amplifier, a main amplifier, and a pulse slicer in an optical path between the regenerative amplifier and the main amplifier.

The output pulse characteristics can be measured with a high dynamics range third-order polarization frequency-resolved optical gating and processor configured to receive the frequency-resolved optical gating and to extract the pulse profile with a phase retrieval algorithm.

BRIEF DESCRIPTION OF DRAWING FIGURES

FIGS. 6A, 6B, and 6C illustrate some aspects of the novel chirped pulse amplifier system with a pulse-shaping beam interference module.

Figure 7A:
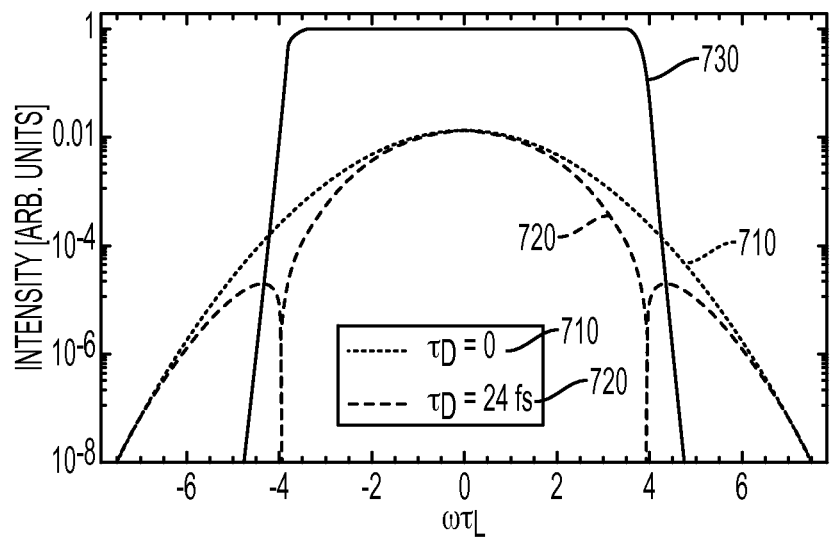

FIG. 7A plots the computer-simulated spectra of two transform-limited 30 femtosecond laser pulses with zero relative delay and with 24 femtosecond relative delay.

Figure 7B:
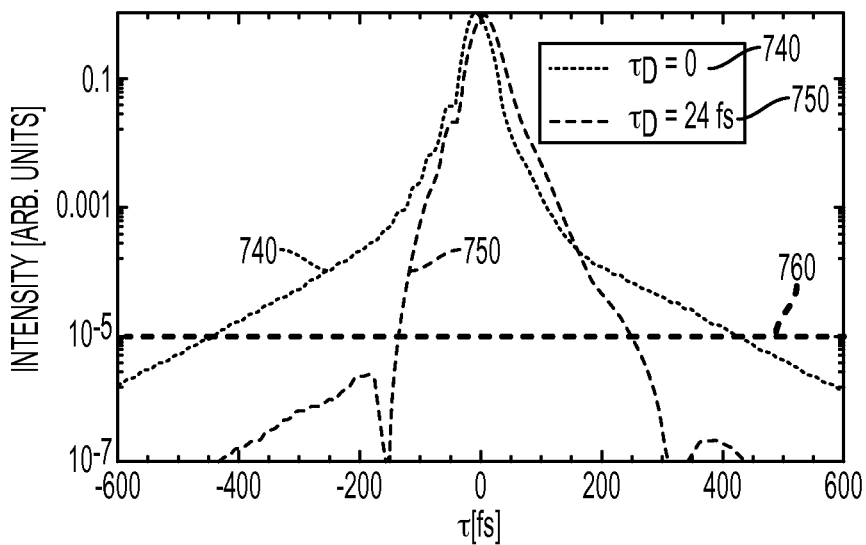

FIG. 7B compares the intensity profiles of the output pulses after compression for relative time delays $\tau_D=0$ and $\tau_D=24$ femtoseconds.

DETAILED DESCRIPTION

Figure 1:
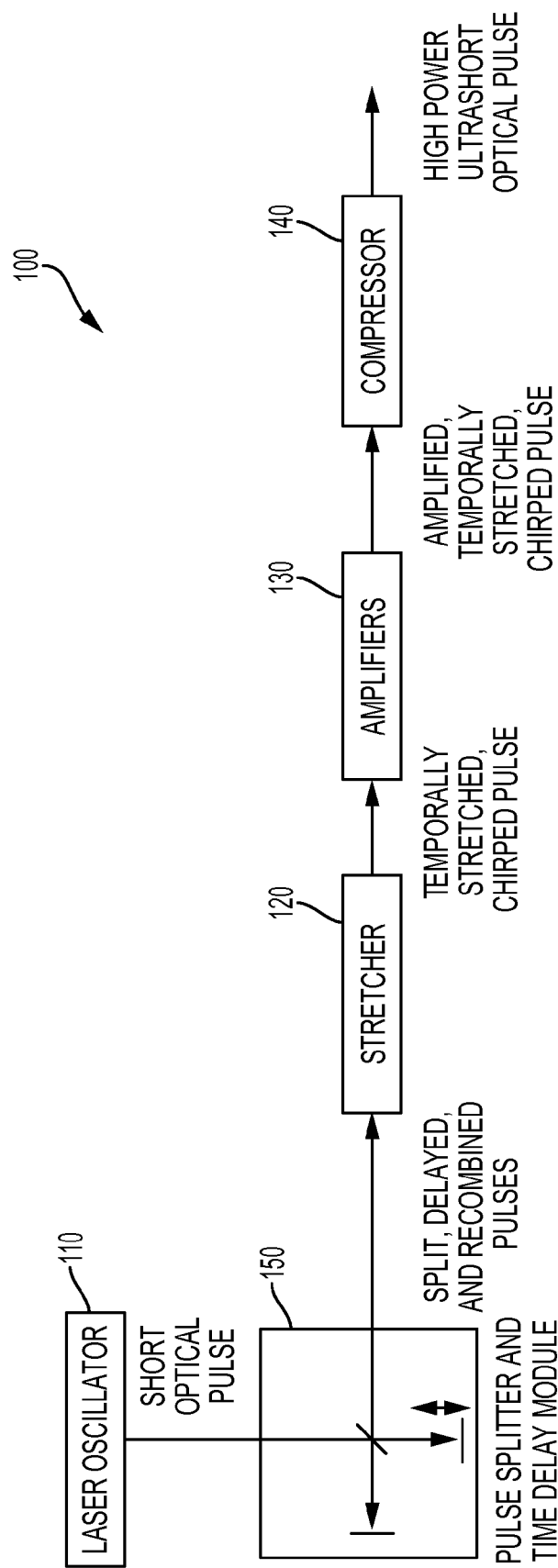
FIG. 1 shows a chirped pulse amplification (CPA) system in accordance with an embodiment of the invention.

FIG. 1 illustrates a novel laser chirped pulse amplifier system 100 that receives a short optical pulse from a laser oscillator 110. The chirped pulse amplifier system 100 includes a stretcher 120, an amplifier 130, and a compressor 140 in an optical path. The system also includes a beam interference module 150 positioned in the optical path. In this example, the beam interference module is positioned in the optical path between the oscillator 110 and the stretcher 120. However, the beam interference module 150 could be positioned at a different point in the optical path, e.g., between the stretcher and the amplifier or between the amplifier and the compressor. The beam interference module 150 receives a short optical pulse from the oscillator. The beam interference module 150 splits the incoming pulse into two or more pulses, and delays at least one of the pulses relative to another of the pulses. The beam interference module 150 recombines the split pulses and transmits the recombined pulses to the pulse stretcher 120. As will be discussed in later paragraphs, by adding a relative time delay to one or more of the pulses, the beam interference module 150 can spectrally modulate the incoming short pulse so the recombined pulses leaving the beam interference module.

The pulse stretcher 120 temporally stretches the recombined pulse to a much longer duration. The stretched optical pulse enters the amplifier 130, and is amplified to a much higher power level. The amplified pulses exit the amplifier 130, and a pulse compressor 140 temporally compresses the pulses to approximately the same temporal length at which they entered the pulse stretcher 120.

Figure 2:
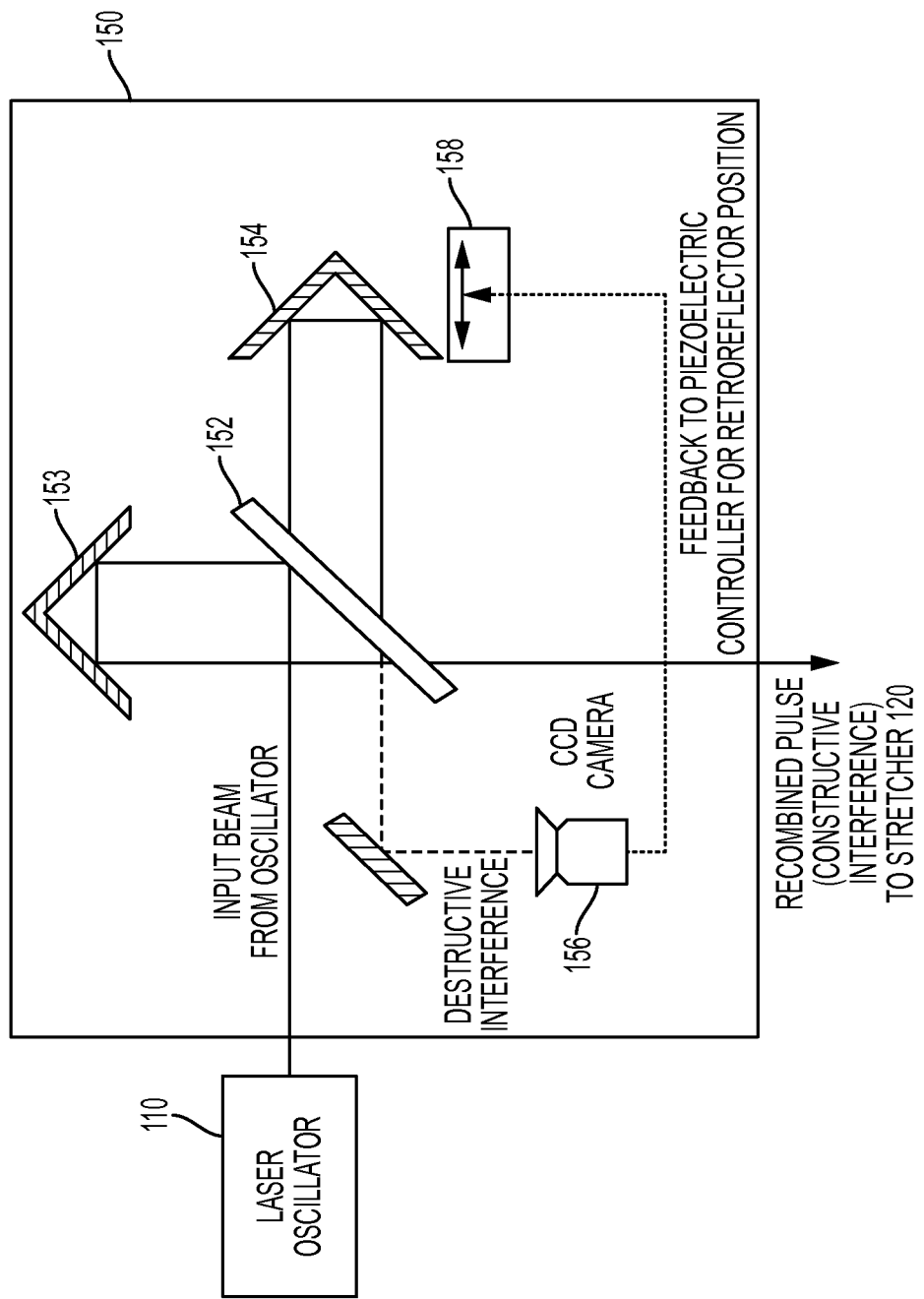
FIG. 2 shows a pulse-shaping beam interference module for use in a chirped pulse amplifier system.

One example of a pulse shaping beam interference module 150 suitable for use with a chirped pulse laser amplifier is shown in FIG. 2.

In this example, the beam interference module 150 is a Michelson interferometer, in which a beamsplitter 152 is in the optical path of the optical pulses from the oscillator 110. The beamsplitter 152 transmits half of the incoming beam to a first reflector 153 and the other half of the beam to a second reflector 154. In this example, the reflectors 154 and 153 in the Michelson interferometer are high-precision retroreflectors. The beamsplitter 152 receives the optical beams from the reflectors 153 and 154, where the beams are coherently recombined and transmitted toward the pulse stretcher 120. The first reflector 153 and second reflector 154 are preferably located at different distances from the beamsplitter 152, providing different optical path lengths for the split beam portions.

In a preferred embodiment, the length of at least one of the optical paths can be controlled and adjusted with high precision. In this example, the position of the reflector 154 and, thus the relative time delay between the two split pulses, can be controlled by a piezoelectric actuator that moves the reflector 154.

The delay lines are controlled by the controller with a 5 nm or better resolution system with active feedback. In this example, a CCD camera 156 provides feedback information from the rejected (destructive interference) beam to the piezoelectric actuator 158. The controller for the piezoelectric actuator receives information about the rejected (destructive interference) beam from a CCD camera, photodiode, photomultiplier, or any other light detector or photodetector adjusts the relative time delay. Alternatively, a controller for the PZT actuator can receive information from a spectrometer, a FROG, or other device that can accurately measure the destructive interference beam or the constructive interference beam.

The high response speed of the PZT material allows the time delay to be precisely set.

Other pulse-shaping beam interference devices can also be suitable if they can precisely set the time delay, and if their components have a high bandwidth so the beam interference device itself will not truncate or otherwise distort the optical pulse. Examples include Fabry-Perot interferometers or etalons. An acousto-optic interferometer might also be suitable, however, currently available AO devices do not have enough bandwidth to avoid truncating or distorting the pulse.

Figure 3:
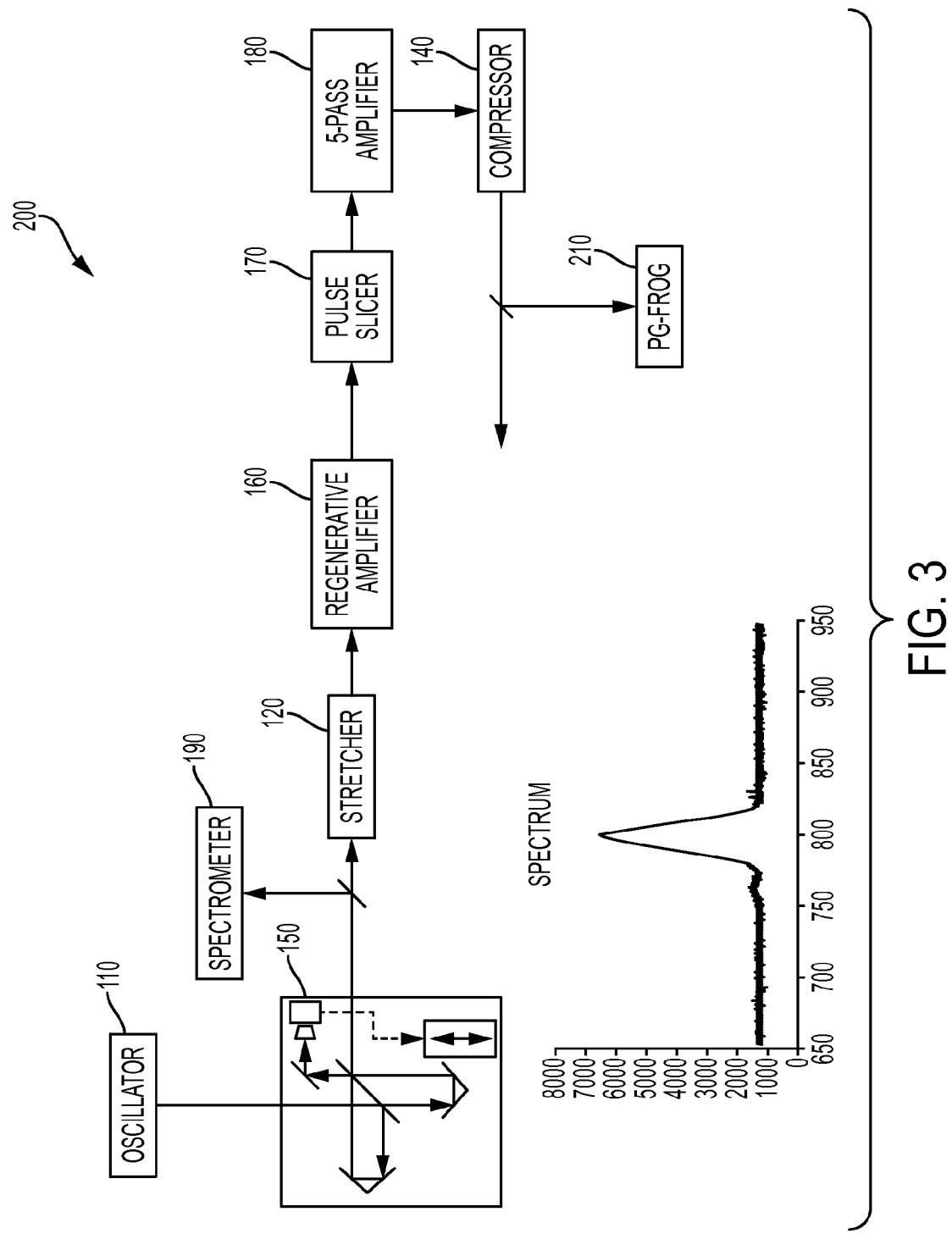
FIG. 3 illustrates a ultra-short laser pulse CPA system with the pulse shaping beam interference module of FIG. 2.

FIG. 3 illustrates an example of a novel chirped pulse amplification laser system 200 in more detail. Here, the system 200 is a 10 terawatt, 50 femtosecond laser system having a 35 femtosecond Ti:Sapphire oscillator, a stretcher, a regenerative preamplifier, 5-pass saturated amplifier, and vacuum compressor. The beam interference module 150, including a Michelson interferometer with a beamsplitter and delay line, is positioned between the oscillator and the stretcher. A controller controls the time delay with piezoelectric actuators, with 10 nanometer resolution. In the example embodiment of FIG. 3, the pulse slicer 170 and regenerative amplifier 160 can reduce the prepulses, postpulses and ASE. For example, a system having a pulse slicer 170 and a finely tuned regenerative amplifier 160, in combination with the Michelson interferometer, can reduce the picosecond to nanosecond scale prepulses, postpulses and ASE to at least the $10^{-7}$ level.

A spectrometer 190 and/or a polarization frequency-resolved optical gating (FROG) 210 can be included in the system 200 to measure and analyze the pulses before and after amplification. A spectrometer or FROG can optionally also provide feedback to the PZT actuator in the beam interferometer module.

As will be discussed more fully in later paragraphs, by precisely choosing the delay between the pulses, specific modulations can be generated in the laser spectrum that significantly reduce the picosecond pedestal in the immediate area of the pulse, e.g., within a few picoseconds of the main pulse. This picosecond pedestal is believed to be caused by spectral width narrowing of the pulse due to limited bandwidth of the optical components in the compressor, amplifier, and stretcher of a chirped pulse amplifier system.

In one embodiment, the delay is chosen such that a zero of the modulated input laser pulse spectrum corresponds with the low-pass limit of the optical system, which results in the chirped pulse amplifier system 200 outputting a single high-contrast ultrashort laser pulse with a dramatically reduced subpicosecond pedestal. Using a time delay of $\tau_D = 2\pi n/\omega_0$ minimizes the pedestal, wherein n is an integer chosen to be approximately equal to $2\omega_0/\Delta\omega$, where $\Delta\omega$ is the characteristic full bandwidth of the laser system. This condition assures that the first zero of the modulated input laser pulse spectrum corresponds to the frequency limit of the laser system.

The subpicosecond scale profile of the amplified and compressed laser pulse can be analyzed using a high dynamics range third-order polarization frequency-resolved optical gating (FROG), and the pulse profile is extracted by a phase retrieval algorithm described in M. H. Helle, D. F. Gordon, D. Kaganovich, and A. Ting, Phys. Rev. ST Accel. Beam, Vol. 15, pp. 052801-1-052801-11 (May, 2012) and generalized to work with various types of FROGs. An advantage of the phase retrieval algorithm is that it uses high bit depth and high-resolution images, leading to better overall convergence and noise floors of $\frac{1}{2}^n$, where n is the bit depth of the image.

Measurement of the laser pulse could also be accomplished by an autocorrelator. However, the FROG can provide single shot, direct electric field and phase reconstruction measurements, a feature that is important for the analysis of the leading and trailing pulse fronts and short time scale pedestal measurements.

Figure 4:
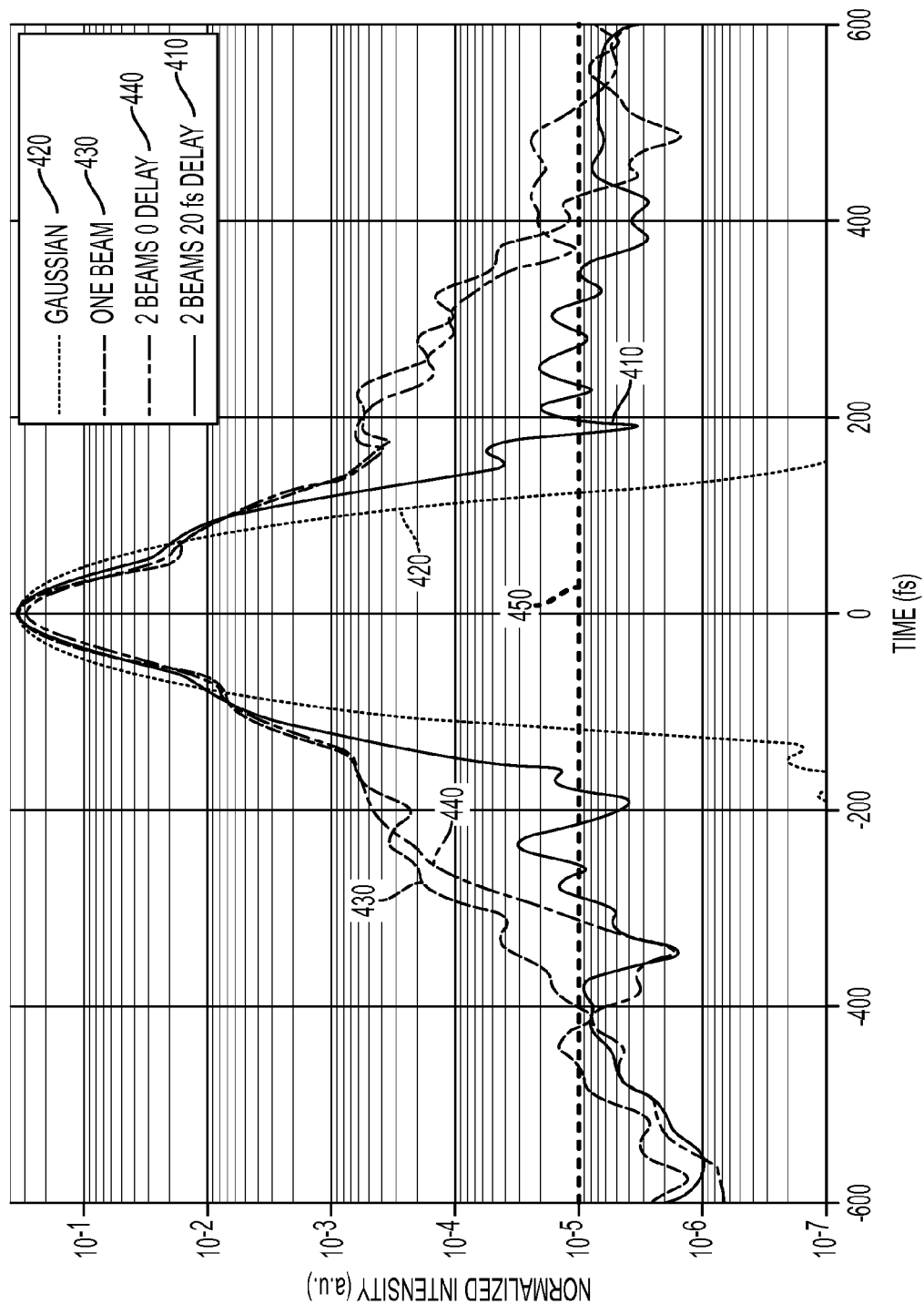
FIG. 4 illustrates the normalized measured temporal intensity of optical pulses generated by the system of FIG. 3 with a single pulse, a modulated pulse based on a zero time delay, and a modulated pulse based on a 20 femtosecond time delay, compared to a Gaussian pulse.

The parameters of the laser system 200 of FIG. 3 are varied to determine the effect of the beam interference module 150 on the ultrashort high power pulses generated by the laser system 200. FIG. 4 illustrates the results by plotting the measured laser intensity profile of the output laser pulse on a semi-log plot of normalized intensity versus time.

First, the system 200 is operated without the beam interference module 150, so the short pulse from the oscillator 150 is transmitted directly to the stretcher. The pulse passes through the stretcher, regenerative amplifier, pulse slicer, five pass amplifier, and compressor. Curve 430 shows the (FROG) trace retrieval for the resulting ultrashort optical pulse from the compressor. Curve 440 shows the FROG trace retrieval for this system with a zero second pulse delay, accomplished by setting the optical path lengths for the Michelson interferometer 150 equal. By comparing the curves 430 and 440, it is seen that a single pulse and a double pulse with zero time delay produce the approximately same signature in the time domain.

Next, the system was operated with the beam interference module 150 in place, with different time delays applied to one of the arms of the Michelson interferometer.

The modulated pulse exiting the beam interference module 150 was evaluated for interferometer path differences between 0 and 20 microns, which correspond to relative delays from 0 to 70 femtoseconds. Data was collected primarily around constructive interference peaks, where the laser intensity was sufficient to fully seed the regenerative amplifier (RA).

As the delay was increased from zero to 25 femtoseconds, a contrast enhancement is seen extending out to about 400 femtoseconds from the peak of main pulse. The curve 410 is the frequency resolved optical gating (FROG) trace retrieval for the CPA system 200 with a time delay of 20 femtoseconds.

The data beyond 400 femtoseconds could not be resolved. This is believed to be due to the limited dynamic range of the 12 bit FROG and a minimum achievable FROG retrieval convergence limit of $10^{-5}$ for experimental data, shown as the dotted line 450. For each curve in FIG. 4, the intensity was normalized by the total area under each curve, and the small contribution from under the $10^{-5}$ FROG retrieval convergence limit 450 was neglected.

Note that for the output pulse laser spectra (curves 430 and 440) resulting from inputting a single pulse and a double pulse with zero delay, respectively, temporal wings 450 distort the pulse traces from a desired Gaussian shape. These wings represent an exponentially rising/falling pedestal in the immediate proximity (±1 picosecond) of the main pulse. The sub-picosecond pedestal is characterized by a contrast ratio that ranges from $5\times10^{-4}$ at 200 femtoseconds from the main pulse, to less than $10^{-4}$ beyond 300 femtoseconds.

By comparison, trace 410 of FIG. 4 shows that including a Michelson interferometer modulating the pulse spectrum by introducing a time delay to a portion of the pulse greatly reduces the temporal wings. Curve 420 shows the transform limited Gaussian beam processed through the same generalized M. H. Helle et al. phase retrieval algorithm used to extract the FROG trace retrieval for curves 410, 430, and 440. At the optimal delay of about 20 femtoseconds, the temporal profile of the laser pulse (410) approaches the transform limited case of a Gaussian pulse (trace 420). As delay was increased beyond 25 femtoseconds, secondary peaks (prepulses and postpulses) appeared in the laser pulse profile (not shown).

This pulse shaping beam inferometry device, with a CPA laser, can generate high power shaped pulses. In one example, the system is configured to generate high power, ultrashort pulses with enhanced laser contrast resulting from greatly reduced "subpicosecond" pedestal, in the in the picosecond region surrounding the main pulse.

As discussed further in later paragraphs, the pedestal appearing in the high energy, ultra—short pulses generated by chirped pulse amplifiers, in the picosecond region surrounding the main pulse appears to be the result of a truncation of the laser spectrum due to the limited bandwidth of the CPA laser system components. Even when the front end of a femtosecond oscillator of a typical CPA system can deliver approximately transform limited (no pedestal) laser pulses, the amplification chain and the chirped pulse components (gratings and mirrors in stretcher or compressor) can introduce significant picosecond-scale pedestal via spectral width narrowing during the amplification process.

Figure 5A:
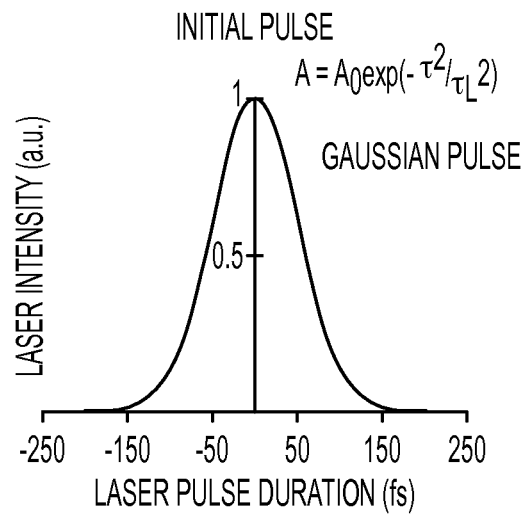
FIG. 5A-5F illustrate how limited bandwidth components in an optical system can truncate the laser pulse spectrum and generate a pedestal.
Figure 5B:
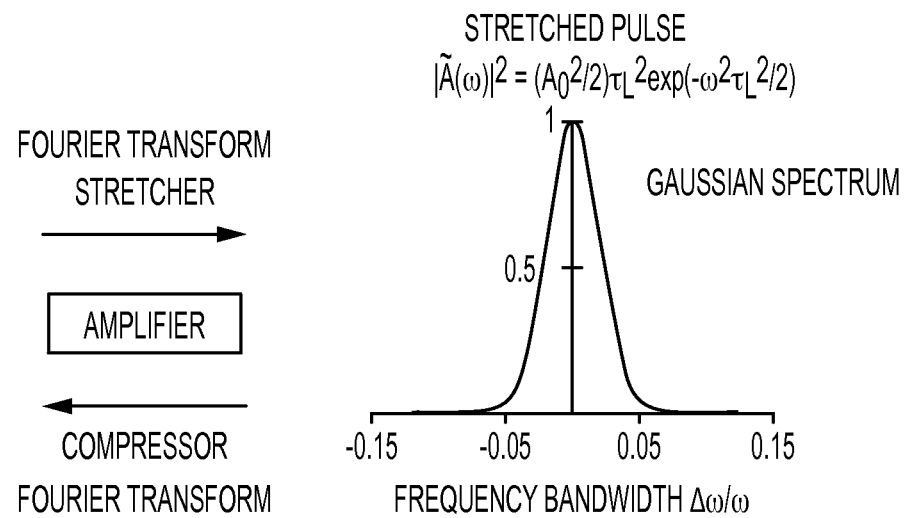
Figure 5D:
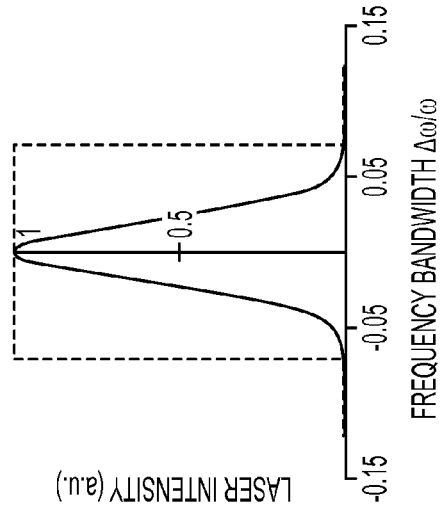
Figure 5F:
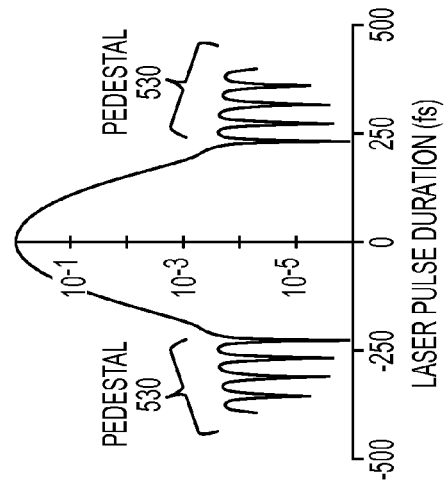

The experimental observations can be explained theoretically based on the simple, linear interference associated with two pulses separated by a relative delay. A single, transform-limited pulse of spectral width≈$1/\tau_L$, where $\tau_L$ is the pulse duration, acquires a temporal pedestal when its spectrum is truncated by the limited bandwidth of the optical system. FIG. 5A-5F illustrate this effect. FIG. 5A shows how a laser spectrum as it is often presented—with the y-axis being a linear scale of normalized intensity with values between zero and one. A laser might be shown as having a peak intensity of $10^{19}$ W/cm$^2$ at zero femtoseconds and a full width half maximum pulse duration of 50 femtoseconds. A stretched pulse after the pulse is passed through a stretcher is shown in FIG. 5B in Fourier space.

Figure 5C:
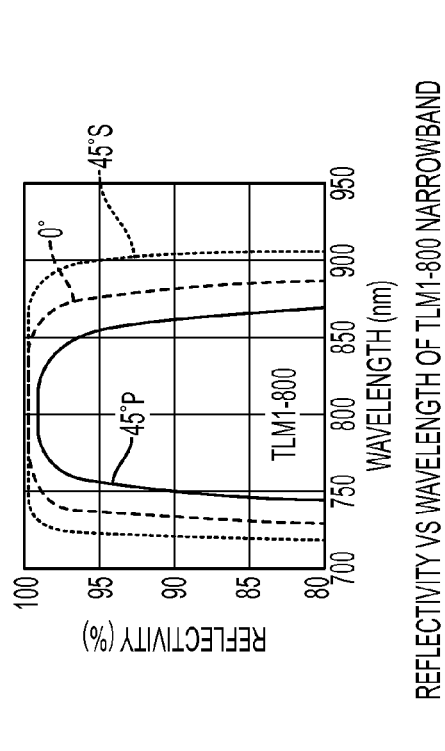
Figure 5E:
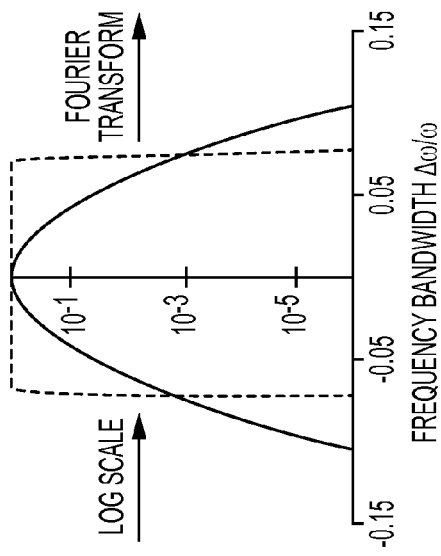

However, when the pulse is shown on a logarithmic scale, the regions at which the laser beam interacts with matter are shown more clearly. System designers attempt to match the components and amplifiers in the optical path to the initial bandwidth of the laser. For example, the bandwidth of a mirror with high reflectivity is shown in FIG. 5C. Note that when viewed on the linear scale of FIG. 5D, the bandwidth envelope of the mirror appears to be a good match for the optical pulse because the bandwidth of the mirror appears to include most or all of the optical pulse. However, when viewed on a logarithmic scale of FIG. 5E, it is seen that the optical pulse is truncated by the mirror's limited bandwidth. This truncation leads to a pedestal such as that illustrated in FIG. 5F.

In the system of FIGS. 1 and 3, the two overlapping pulses, one of which has a relative time delay, are combined to produce a pulse with a modulated spectrum. When the time delay is selected such that a zero of the spectrum corresponds with the low-pass limit of the optical system, the output subpicosecond pulse pedestal is greatly reduced. This can produce a single high-contrast pulse with a dramatically reduced subpicosecond pedestal. The concept can be considered to be somewhat analogous to the nearly diffraction-free propagation of a Bessel beam through a matched aperture. The propagation of a Bessel beam through a match aperture is described in P. L. Overfelt and C. S. Kenney, J. Opt. Soc. Am. A 8, 732 (1991).

Consider a Laser Electric Field Expressed as $$E=(\tfrac{1}{2})\hat{x}A(z,t)\exp[i(k_0z-\omega_0 t)]+c.c.,$$

where z is the propagation coordinate, t is time, $k_0$ is the wavenumber, and the laser pulse envelope A is assumed to vary slowly compared to the optical frequency $\omega_0$. The initial laser envelope 610 is taken to have a Gaussian temporal profile with duration $\tau_L$, i.e., $$A(z=0,\tau)=A_0 g(\tau),$$

where $g(\tau)=\exp(-\tau^2/\tau_L^2)$. Passing the pulse through a splitter and delay line results in a pulse envelope $$A=(\tfrac{1}{2})A_0[g(\tau-\tau_D)e^{i\omega_0\tau_D}+g(\tau)],$$

where $\tau_D$ is the delay time. FIG. 6A shows a modulated laser spectrum 620 that results from passing a laser pulse through the beam interference module 150 of FIGS. 1, 2 and 3. The magnitude of the spectrum of this envelope, shown in Fourier space in FIG. 6B, can be written as $$|\tilde{A}(\omega)|^2=(A_0^2/4)\tau_L^2\exp(-\omega^2\tau_L^2/2)\{1+\cos[(\omega+\omega_0)\tau_D]\}.$$

The Fourier transform 620 of the spectrally modulated input optical pulse is shown in FIG. 6B, overlaid with an envelope 630 showing the bandwidth of an optical system. In the example of FIGS. 1, 2, and 3, the optical system includes the components of the chirped pulse amplifier (stretcher, amplifiers, compressor, and associated optical components). Using a time delay of $\tau_D=2\pi n/\omega_0$, minimizes the pedestal that results from passing the modulated input laser pulse through the laser system, wherein n is an integer chosen to be approximately equal to $2\omega_0/\Delta\omega$, where $\Delta\omega$ is the characteristic full bandwidth of the laser system. This condition assures that the first zero 621, 622 of the modulated input laser pulse spectrum 620 (the modulated pulse exiting the interferometer and entering the stretcher) corresponds to the frequency limits 631, 632 of the chirped pulse amplifier laser system, as seen in FIG. 6B.

Because the zeros of the modulated input pulse spectrum correspond to the frequency limits of the chirped pulse amplifier system, truncation of the laser spectrum does not significantly modify the spectrum and the picosecond pedestal is reduced. Curve 650 of FIG. 6C shows the output of an optical system when the input the modulated pulse from a beam interferometer with a time delay approximately equal to $\tau_D=2\pi n/\omega_0$, where n is an integer chosen to be approximately equal to $2\omega_0/\Delta\omega$, and $\Delta\omega$ is the characteristic full bandwidth of the laser system. Curve 640 shows the result of generating a modulated pulse with a zero time delay and passing the pulse through the same optical system. Note that the curve 650 displays a greatly reduced pedestal, the result of using an optimized time delay of approximately $\tau_D=2\pi n/\omega_0$).

A Ti:Sapphire laser amplifier is considered as one example. The characteristic bandwidth for mirrors used in Ti:Sapphire laser amplifiers is $\Delta\omega/\omega\approx 0.2$ (CVI high damage threshold Ti:Sapphire, 45 degree P-polarization). If these mirrors constitute the dominant bandwidth limitation of the laser system, then from the discussion above, the optimal delay time that would reduce the pedestal is approximately equal to 24 femtoseconds. To illustrate this, FIG. 7A plots the spectra of a transform-limited 30 femtosecond laser pulse with zero relative delay 710 and a transform-limited 30 femtosecond laser pulse with a 24 femtosecond relative delay 720. The envelope function 730 of a low-pass spectral filter associated with a 20% bandwidth is also shown.

The envelope 730 is described analytically using hyperbolic tangents with variable scale lengths. The interference caused by the delay results in a modulated spectrum in which the central lobe is matched to the bandwidth of the low-pass filter. Inverse Fourier transforming these spectra after applying the low-pass filter will show that the pulses generated with a CPA system having a beam interferometer with a 24 femtosecond delay in one of the optical paths will have a pedestal that is orders of magnitude smaller than the case with zero delay, as shown graphically in FIGS. 6C and 6D and discussed above.

Pulses passing through a Ti:Sapphire CPA system are modeled and simulated to determine whether this mechanism can explain the observed experimental results. The Ti:Sapphire medium can be approximately modeled as a two level system using standard density matrix formalism. Coupling the density matrix formalism with the paraxial wave equation results in the following equations describing the propagation of the laser envelope and the associated time-dependent and space-dependent local gain, g(z,τ), $$\frac{\partial}{\partial z}A = \frac{1}{2}\frac{\Gamma_{21}}{\Gamma_{21}-i\Delta}gA - i\frac{\beta_2}{2}\frac{\partial^2}{\partial \tau^2}A + i\alpha|A|^2 A, \quad (1.1)$$

$$g(z,\tau) = g_0 \exp\left[\frac{-\Gamma_{sat}\Gamma_{21}^2}{\Gamma_{21}^2+\Delta^2}\int_{\tau_0}^{\tau}\frac{|A(z,\tau')|^2}{|A_0|^2}d\tau'\right] \quad (1.2)$$

where $\tau=t-z/v_g$, $v_g$ is the group velocity of the laser pulse, $g_0$ is the characteristic gain of the medium immediately after the pump pulse, $\tau_0$ denotes a time after the pump pulse but before the arrival of the seed laser pulse, $\Delta=\omega_0-\omega_{21}$ is the detuning of the laser from the upper to lower level transition frequency, and $\Gamma_{21}\approx 7.4$ fs is the dipole coherence time according to J. Zhou et al., Opt. Lett. 19, 1149 (1994)). The $\beta_2$ is the group velocity dispersion coefficient, $\alpha=(2\pi/\lambda)n_2 I_0$ is the coefficient of nonlinearity, and $I_0=n_0 c|A_0|^2/(8\pi)$ is the initial peak laser intensity at z=0. The $\Gamma_{sat}=2\sigma_{stim}I_0/(\hbar\omega_0)$, where $\sigma_{stim}\approx 5\times 10^{-19}$ cm$^2$ is the cross section for stimulated emission in Ti:Sapphire according to P. F. Moulton, J. Opt. Soc. Am. B 3, 125 (1986). Further, $n_2=3.2\times 10^{-16}$-cm$^2$/W is the nonlinear index of Ti:Sapphire and $n_0=1.76$ is the linear refractive index of Ti:Sapphire at wavelength λ=800 nm.

Equation (1.1) describes the propagation of the laser pulse under the local (instantaneous) gain approximation and Eq. (1.2) describes gain saturation by the amplified laser pulse. In writing Eqs. (1.1) and (1.2), it is assumed that the laser envelope varies slowly compared with $\Gamma_{21}$ and the spontaneous decay (fluorescence) of the upper level, which happens on a time scale (≈3 μs) much longer than the laser pulse duration, is neglected.

The propagation of a laser pulse through a system consisting of a pulse splitter, stretcher, regenerative pre-amplifier (RA), a main amplifier (MA), and compressor is modeled with all laser system parameters used in the simulation closely matching those of the laser system used in the experiment. The initial laser pulse is taken to have a Gaussian temporal profile with duration $\tau_L$, i.e., $$A(z=0,\tau)=A_0 a(\tau),$$

where $a(\tau)=\exp(-\tau^2/\tau_L^2)$. The action of the splitter results in the superposition of two pulses with a relative delay, $\tau_D$, i.e., $$A=(\tfrac{1}{2})A_0[a(\tau-\tau_D)e^{i\omega_0\tau_D}+a(\tau)].$$

The pulse stretcher acts in Fourier space and introduces a chirp to the pulse. The stretched pulse envelope is given by $$A_{str}=FT^{-1}[\exp(i\phi_2\omega^2+i\omega_3\omega^3)FT(A)],$$

where FT (A) denotes the temporal Fourier Transform of A from τ space to ω space and the constants $\phi_2$ and $\phi_3$ characterize the stretcher gratings. The amplification of the stretched pulse is then modeled by solving Eqs. (1.1) and (1.2) using the parameters of the RA and MA from the experiment. Before going into the MA, the pulse is expanded transversely. In this 1D model, pulse intensity after the RA is lowered to account for this. The amplified, stretched pulse is then compressed according to an equation $$A=FT^{-1}[\exp(i\phi'_2\omega^2-i\phi'_3\omega^3)FT(A_{str})]$$

to yield the final laser pulse form. The constants $\phi'_2$ and $\phi'_3$ are chosen to give the minimum pulse length for $\tau_D=0$.

FIG. 7B compares the intensity profiles of the output pulses 740 and 750 (after compression) for relative time delays $\tau_D=0$ and $\tau_D=24$ femtoseconds, respectively. The dashed line 760 represents the experimental limit for contrast resolution. The pedestal reduction observed in the simulation appears to be greater than measured in the experiments, but this is due to the limited resolution of the experimental diagnostics for contrast less than $10^{-5}$. Taking this into account, the simulated pulse profiles are in excellent agreement with the experiments. The FWHM pulse duration and the pulse energy (0.5 J) is the same for the two cases. When the pulse delay is increased beyond the 24 femtosecond optimal case, the formation of secondary peaks in the laser pulse intensity was observed, which is also consistent with experimental observations.

Instead of minimizing the subpicosecond pedestal of the pulse output of the CPA system, the pulse-shaping beam interferometer module can also be configured to create different output pulse shapes. A beam interferometer module with a time delay greater or less than $\tau_D=2\pi n/\omega_0$ in combination with the CPA stretcher, amplifier, and compressor components, can produce a CPA output pulse shape suitable for different applications.

It can also be suitable to split the incoming pulse into more than two pulses. For example, a Fabry-Perot interferometer device can split the pulse into many pulse portions. A possible disadvantage of using an etalon as the beam interferometer module is that it can require a precisely manufactured coating that is not adjustable to accommodate any changes in the laser system. In contrast, the time delay of the optical paths in the Michelson interferometer can easily be adjusted with the PZT actuator system.

The pulse shaping beam interference module can also include more than one interferometer. Delaying several of the split pulses by different amounts can produce CPA output pulse having a complex form needed for a particular application.

The system of subpicosecond ultrashort pulse shaping and subpicosecond pedestal contrast enhancement discussed herein can be implemented in higher power lasers. According to the measurements done on Astra and Gemini lasers (see C. Hooker et al., Opt. Express 19, 2193 (2011)), the coherent, short time pedestal is essentially the same for terawatt and petawatt scale lasers, so the novel system is believed to be able to be implemented in petawatt scale lasers as well. In addition, the system can be implemented in other laser amplifiers that rely on double chirped pulse amplification (e.g., M. P. Kalashnikov et al., Opt. Lett. 30, 923 (2005)), and the cross-polarized wave filtering techniques described in A. Jullien et al., Opt. Lett. 30, 920 (2005). It is believed that the combination of the spectral modulation system described herein with these techniques can produce temporally clean laser pulses at both short (subpicosecond) and long (tens of picoseconds) time scales.

Thus, by using a simple pulse splitter and delay line, significant (order of magnitude) improvement of subpicosecond-scale laser contrast is achieved. This contrast enhancement is believed to be the result of linear interference among two chirped input pulses producing a modulated laser spectrum that is matched to the bandwidth of the optical system. By working near points of constructive interference and operating the amplifiers at saturation, the energy in the amplified pulse is preserved.

The phase retrieval algorithm described in M. H. Helle, D. F. Gordon, D. Kaganovich, and A. Ting, Phys. Rev. ST Accel. Beam, Vol. 15, pp. 052801-1-052801-11 (May, 2012), incor-

What is claimed as new and desired to be protected by Letters Patent of the United States is:

1. A high power chirped pulse amplifier system for generating a short pulse with enhanced laser contrast by constructive interference of split pulses, comprising:
a chirped pulse amplifier laser module including
an optical pulse stretcher that receives an optical pulse and temporally stretches duration of the pulse,
at least one optical power amplifier that amplifies power of the temporally stretched pulse, and
an optical pulse compressor that temporally compresses the amplified temporally stretched optical pulse; and
at least one beam interferometer positioned in the optical path of the chirped pulse stretcher before the compressor, the amplifier or the stretcher, operable to receive an optical pulse, split the input pulse into at least two pulses, to direct the split pulses along an optical path such that at least one of the split pulses is time delayed with respect to another of the split pulses, and to recombine the split pulses after the time delay,
wherein the time delay $\tau_D$ is equal to about $2\pi n/\omega_0$, where n is an integer approximately equal to $2\omega_0/\Delta\omega$, where $\Delta\omega$ is the characteristic full bandwidth of the chirped pulse amplifier laser module and $\omega_0$ is the optical frequency of an input optical pulse.

2. The chirped pulse amplifier system according to claim 1, wherein the beam interferometer includes at least one Michelson interferometer having a beamsplitter, a first arm, and a second arm with a different optical path length than the first arm to delay the pulse in the second arm with respect to the pulse in the first arm.

3. The system according to claim 2, wherein the Michelson interferometer has at least two retroreflectors, and a piezoelectric actuator configured to adjust the position of at least one of the retroreflectors to change the time delay of one of the optical pulses.

4. The chirped pulse amplifier system according to claim 1, wherein the beam interferometer includes at least one optical etalon.

5. The system according to claim 1, wherein the at least one optical power amplifier comprises a regenerative pre-amplifier and a main amplifier, and the chirped pulse amplifier module further comprises a pulse slicer in an optical path between the regenerative amplifier and the main amplifier.

6. The system according to claim 1, further comprising:
a high dynamics range third-order polarization frequency-resolved optical gating and processor configured to receive the frequency-resolved optical gating and to extract the pulse profile with a phase retrieval algorithm.

7. The system according to claim 1, further comprising:
a controller and a feedback system for adjusting the time delay added to the at least one of the split pulses.

8. The system according to claim 7, further comprising:
a piezoelectric actuator configured to adjust the position of at least one of the reflectors to adjust a time delay.

9. A high power chirped pulse amplifier system for generating a short pulse with enhanced laser contrast by constructive interference of split pulses, comprising:
a chirped pulse amplifier laser module including
an optical pulse stretcher that receives an optical pulse and temporally stretches duration of the pulse,
at least one optical power amplifier that amplifies power of the temporally stretched pulse, and
an optical pulse compressor that temporally compresses the amplified temporally stretched optical pulse; and
at least one beam interferometer positioned in the optical path of the chirped pulse stretcher before the compressor, the amplifier or the stretcher, operable to receive an optical pulse, split the input pulse into at least two pulses, to direct the split pulses along an optical path such that at least one of the split pulses is time delayed with respect to another of the split pulses, and to recombine the split pulses after the time delay,
wherein the time delay $\tau_D$ is such that a zero of a spectrum of the pulses from the beam interferometer corresponds with a low-pass limit of the chirped pulse amplifier laser module.

10. The chirped pulse amplifier system according to claim 9, wherein the beam interferometer includes at least one Michelson interferometer having a beamsplitter, a first arm, and a second arm with a different optical path length than the first arm to delay the pulse in the second arm with respect to the pulse in the first arm.

11. The system according to claim 10, wherein the Michelson interferometer has at least two retroreflectors, and a piezoelectric actuator configured to adjust the position of at least one of the retroreflectors to change the time delay of one of the optical pulses.

12. The chirped pulse amplifier system according to claim 9, wherein the beam interferometer includes at least one optical etalon.

13. The system according to claim 9, wherein the at least one optical power amplifier comprises a regenerative pre-amplifier and a main amplifier, and the chirped pulse amplifier module further comprises a pulse slicer in an optical path between the regenerative amplifier and the main amplifier.

14. The system according to claim 9, further comprising:
a high dynamics range third-order polarization frequency-resolved optical gating and processor configured to receive the frequency-resolved optical gating and to extract the pulse profile with a phase retrieval algorithm.

15. The system according to claim 9, further comprising:
a controller and a feedback system for adjusting the time delay added to the at least one of the split pulses.

16. The system according to claim 15, further comprising:
a piezoelectric actuator configured to adjust the position of at least one of the reflectors to adjust a time delay.

17. A method for generating high power ultrashort optical pulses with enhanced laser contrast by constructive interference of split pulses, the method comprising:
receiving a short optical pulse;
stretching a pulse duration of the pulse;
amplifying the intensity of the stretched optical pulse;
compressing the amplified stretched optical pulse to a pulse duration approximately equal to the duration of the optical pulse before stretching; and
temporally modulating the optical pulse by splitting the pulse into at least two optical pulses, applying a non-zero time delay to at least one of the at least two optical pulses, and recombining the split pulses, before said compressing, said amplifying, or said stretching, wherein the time delay $\tau_D$ is equal to about $2\pi n/\omega_0$, where n is an integer approximately equal to $2\omega_0/\Delta\omega$, where $\Delta\omega$ is the characteristic full bandwidth of the chirped pulse amplifier module and $\omega_0$ is the optical frequency of the input optical pulse.

18. A method according to claim 17, wherein said temporally modulating the optical pulse is done before said stretching.

19. The method according to claim 17, wherein said temporally modulating the optical pulse is accomplished by passing the input optical beam through at least one Michelson interferometer having a beamsplitter, a first arm, and a second arm with a different optical path length than the first arm to delay the pulse in the second arm with respect to the pulse in the first arm.

20. The method according to claim 19, wherein the Michelson interferometer has at least two retroreflectors, and a piezoelectric actuator configured to adjust the position of at least one of the retroreflectors to change the time delay of one of the optical pulses.

21. The method according to claim 17, said temporally modulating the optical pulse is accomplished by passing the input optical beam through at least one optical etalon.

22. The method according to claim 17, wherein said amplifying the modulated optical pulse comprises passing the modulated optical pulse through a regenerative pre-amplifier, a main amplifier, and a pulse slicer in an optical path between the regenerative amplifier and the main amplifier.

23. The method according to claim 17, further comprising:
measuring the output pulse characteristics with a high dynamics range third-order polarization frequency-resolved optical gating and processor configured to receive the frequency-resolved optical gating and to extract the pulse profile with a phase retrieval algorithm.

24. A method for generating high power ultrashort optical pulses with enhanced laser contrast by constructive interference of split pulses, the method comprising:
receiving a short optical pulse;
stretching a pulse duration of the short optical pulse;
amplifying the intensity of the stretched optical pulse;
compressing the amplified stretched optical pulse to a pulse duration approximately equal to the duration of the optical pulse before stretching;
and
temporally modulating the optical pulse by splitting the pulse into at least two optical pulses, applying a non-zero time delay to at least one of the at least two optical pulses, and recombining the split pulses, before said compressing, said amplifying, or said stretching,
wherein the time delay $\tau_D$ causes a zero of a spectrum of the temporally modulated pulse to correspond with a low-pass limit of the chirped pulse amplifier module.

25. The method according to claim 24, wherein said temporally modulating the optical pulse is done before said stretching.

26. The method according to claim 24, wherein said temporally modulating the optical pulse is accomplished by passing the input optical beam through at least one Michelson interferometer having a beamsplitter, a first arm, and a second arm with a different optical path length than the first arm to delay the pulse in the second arm with respect to the pulse in the first arm.

27. The method according to claim 25, wherein the Michelson interferometer has at least two retroreflectors, and a piezoelectric actuator configured to adjust the position of at least one of the retroreflectors to change the time delay of one of the optical pulses.

28. The method according to claim 24, said temporally modulating the optical pulse is accomplished by passing the input optical beam through at least one optical etalon.

29. The method according to claim 24, wherein said amplifying the modulated optical pulse comprises passing the modulated optical pulse through a regenerative pre-amplifier, a main amplifier, and a pulse slicer in an optical path between the regenerative amplifier and the main amplifier.

30. The method according to claim 24, further comprising:
measuring the output pulse characteristics with a high dynamics range third-order polarization frequency-resolved optical gating and processor configured to receive the frequency-resolved optical gating and to extract the pulse profile with a phase retrieval algorithm.

* * * * *